ELIZABETH MARY STIGALE, OF PHILADELPHIA, PENNSYLVANIA.

Letters Patent No. 89,515, dated April 27, 1869.

METHOD OF PRESERVING FLOWERS.

The Schedule referred to in these Letters Patent and making part of the same.

*To all whom it may concern:*

Be it known that I, ELIZABETH MARY STIGALE, of Philadelphia, Pennsylvania, have invented a Mode of Preserving Flowers; and I do hereby declare the following to be a full, clear, and exact description of the same.

My invention consists in the preservation of flowers from the effects of exposure, by preparing them as described hereafter, and confining them in air-tight cases.

In order to enable others to practise my invention, I will now proceed to describe the mode of carrying the same into effect.

Before describing my invention it will be necessary to remark that it has been a practice heretofore to subject flowers to such treatment that their beauty and freshness will be preserved for a time when they are not subjected to great exposure.

The flowers are taken gently apart, and the different pieces dried quickly in hot, fine sand, after removal from which the pieces are put together in their original relative position.

The flowers thus prepared retain their original brilliant colors and fresh appearance, but they fade, however, if subjected to exposure.

I have found, however, that if these sand-dried flowers are confined within air-tight cases, they will retain all their fresh appearance, even if they are placed in the most exposed situations. Thus flowers, leaves, and grasses may after being prepared as described, be placed in a group in any suitable air-tight case, and exposed in a grave-yard during the most severe weather, and yet every flower and leaf will retain its original shape and beauty.

I am aware that flowers have been confined in air-tight cases with the view of preserving them; this, therefore, I do not claim, nor do I claim of itself the quick drying of flowers in hot sand; but

I claim as my invention, and desire to secure by Letters Patent—

The preservation of flowers from the effects of exposure, by preparing them as described, and confining them in air-tight cases as set forth.

In testimony whereof, I have signed my name to this specification in the presence of two subscribing witnesses.

E. M. STIGALE.

Witnesses:
 JOHN WHITE,
 LOUIS BOSWELL.